ELECTRONIC CIRCUIT

Filed June 3, 1964

INVENTOR.
HUGO W. SCHAFFT.
BY Mueller & Aichele
Attys.

United States Patent Office 3,349,279
Patented Oct. 24, 1967

3,349,279

ELECTRONIC CIRCUIT

Hugo W. Schafft, Des Plaines, Ill., assignor to Motorola, Inc., Franklin Park, Ill., a corporation of Illinois Filed June 3, 1964, Ser. No. 372,254
3 Claims. (Cl. 315—27)

ABSTRACT OF THE DISCLOSURE

The circuit includes a transistor and a damper diode coupled in parallel which respond to a drive signal to form a sawtooth current for a horizontal deflection yoke. A capacitor is coupled in series with the yoke and the output electrodes of the transistor. A DC operating voltage supply and a further diode are coupled in series to the junction of the capacitor and the yoke. The further diode is poled with respect to the supply to maintain on the capacitor a voltage which exceeds the operating voltage.

Figure 1:
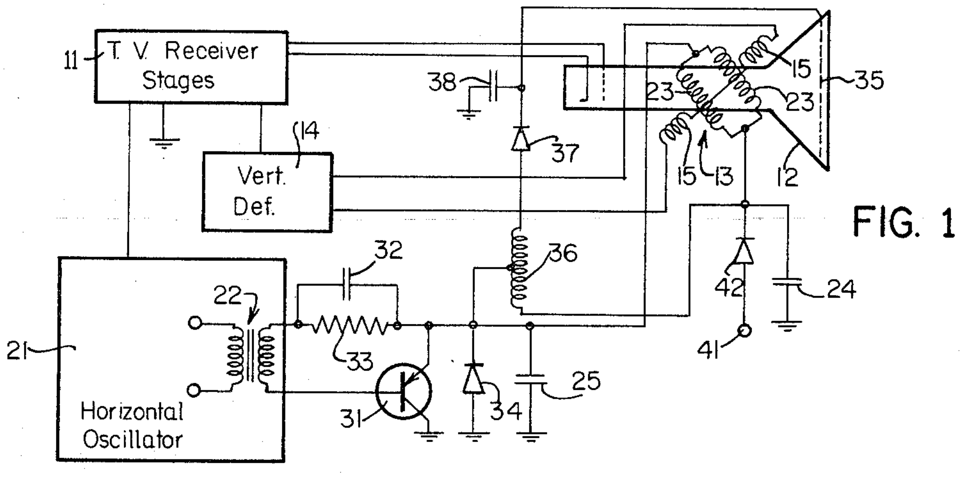

This invention relates to cathode ray tube apparatus and more particularly to a horizontal deflection circuit for a cathode ray tube.

In cathode ray tube apparatus, such as for example a television receiver, an image is produced on the screen of the tube by a beam of electrons which is deflected in direction and changed in intensity according to certain input signals. In television receivers, this beam of electrons makes a series of horizontal traces or sweeps across the screen of the cathode ray tube, each trace being stepped slightly above the other. After each trace, the beam is blanked and deflected back in a retrace or flyback sweep to the starting point to begin a new trace. The neck of the cathode ray tube is generally provided with a deflection yoke comprised of inductance windings which produce a field to deflect the electron beam according to the current through the yoke.

A horizontal deflection circuit for such a cathode ray tube includes a deflection yoke and a circuit which produces sawtooth waves of current. Current is conducted through the yoke first in one direction and then in the other direction. For larger tubes requiring a wider sweep, a slightly S-shaped curve between peaks of the sawtooth wave is desirable. A horizontal deflection circuit generally include a large reactance for storing some of the deflection energy used in order that this energy is not entirely wasted.

With the advent of semiconductors it has become desirable in certain circumstances to utilize a transistor for controlling the conduction in a horizontal deflection circuit. Transistors, being inherently low voltage, low impedance devices, have heretofore not been entirely satisfactory for horizontal deflection circuits. This is because if a low impedance yoke is used for proper impedance matching, a higher yoke current is necessary to attain the proper deflection field strength. The higher current results in correspondingly higher losses in the system. Furthermore, the necessity for operating at lower voltages requires the use of relatively more expensive components.

Accordingly, it is an object of this invention to provide an improved horizontal deflection circuit utilizng a transistor switch and a high impedance yoke.

Another object of the invention is to provide a horizontal deflection circuit which operates at a higher average voltage than has heretofore been possible with transistors.

Figure 2:
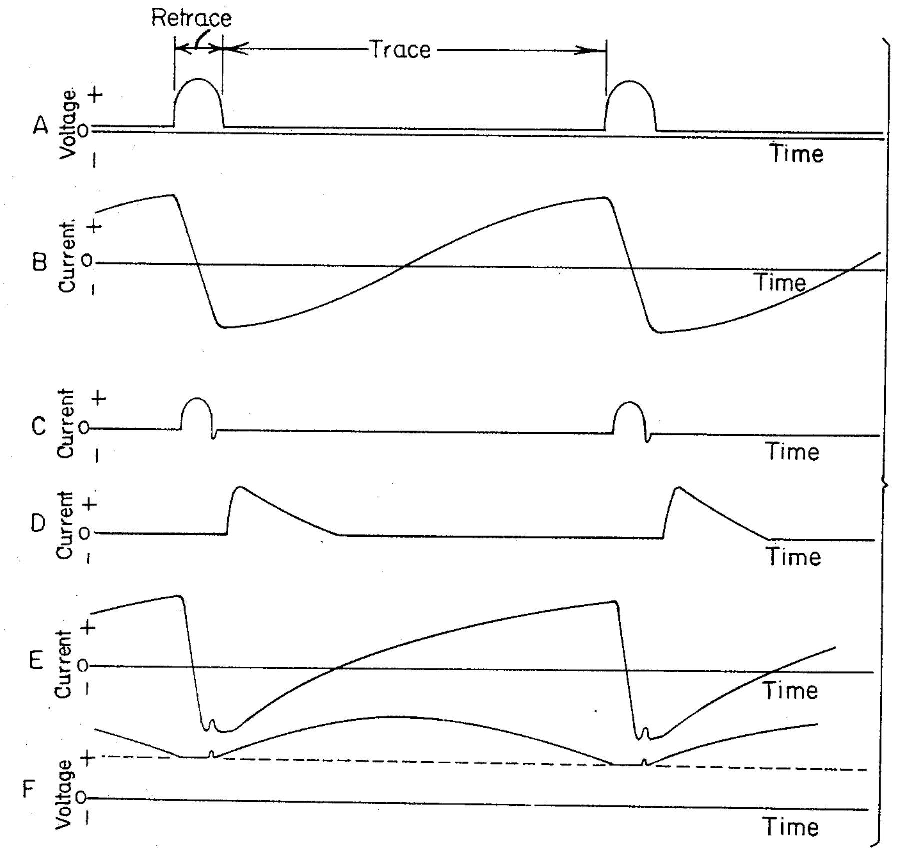

In the drawings:

FIG. 1 is a schematic diagram of a horizontal deflection circuit constructed in accordance with the invention, and FIG. 2 is a series of curves illustrating the operation of the circuit of FIG. 1.

In accordance with the invention, a horizontal deflection circuit for a cathode ray tube includes a deflection yoke and first and second capacitors respectively connecting opposite sides of the yoke to a reference potential. The first and second capacitors are tuned with the yoke to frequencies respectively related to the trace and retrace frequencies. Switching means are included in the circuit for alternately connecting and disconnecting the juncture between the second capacitor and the yoke, to and from a reference potential. This switching means is operable at a predetermined frequency and may include a parallel combination of an oscillator controlled transistor and a damper diode. A further diode is connected to the juncture between the first capacitor and the yoke and is adapted for connection to the source of operating potential. This latter diode is poled to be conductive toward the juncture between the yoke and first capacitor to maintain the potential thereat at least at the operating potential.

Referring now more particularly to FIG. 1, there is shown a television receiver having the usual stages 11 for translating the wave signal intelligence picked up by the receiver. The output of these stages is applied to the various electrodes in a cathode ray tube 12 for controlling the intensity of the electron beam as it sweeps the screen of the tube to produce an image. The neck of the cathode ray tube is surrounded by a deflection yoke 13 which includes inductance windings for the vertical and horizontal deflection of the electron beam in the cathode ray tube. A vertical deflection circuit 14 is connected to the vertical deflection windings 15 of yoke 13.

The receiver also includes a horizontal oscillator circuit 21 which provides an output through a transformer 22 to the horizontal deflection circuit of the invention. This horizontal deflection circuit includes parallel connected horizontal deflection windings 23 in yoke 13, and a pair of capacitors 24 and 25 connecting opposite ends of windings 23 to a reference potential. Capacitor 24 is tuned with windings 23 to a frequency related to the trace frequency of the receiver and introduces a slight S-shape to the sweep portion of the curve for linearity correction. Capacitor 25 is tuned with windings 23 to a frequency related to the retrace or flyback frequency.

A transistor 31 has an emitter portion connected to the juncture between capacitor 25 and windings 23, and has a collector portion connected to the reference potential. A parallel combination of capacitor 32 and resistor 33 connects the emitter of transistor 31 to one side of the secondary winding of transformer 22. The base portion of transistor 31 is connected to the opposite side of the secondary winding of transformer 22. A damper diode 34 has its cathode connected to the juncture between capacitor 25 and winding 23 and has its anode connected to the reference potential so that damper diode 34 is parallel with transistor 31.

In accordance with the invention, the source of operating potential 41 is connected into the system through a diode 42 which has its cathode connected to the juncture between capacitor 24 and windings 23, and has its anode connected to the source 41. Diode 42 will prevent the voltage across capacitor 24 from falling below the operating potential of source 41.

High voltage for the plate 35 of the cathode ray tube 12 is derived from autotransformer 36. Transformer 36 has its primary connected across windings 23 and its secondary connected through high voltage rectifier diode 37 to plate 35. Capacitor 38 is used to filter the pulsating DC from diode 37.

The operation of the circuit may be more readily understood from examining the various curves shown in FIG. 2. Curve A represents the voltage on the emitter portion of transistor 31. The output of the horizontal oscillator will maintain this transistor nonconductive for the retrace time and the initial portion of the trace time.

Curve B of FIG. 2 represents the current through the windings 23. It will be seen that when the transistor 31 is cut off during retrace, the inductive collapse of windings 23 will cause the current flow to first fall sharply and then flow in the reverse direction.

Curve C represents the current through diode 42. It will be seen that diode 42 replenishes the circuit with energy from source 41 during a portion of the retrace cycle. The slight dimple in the curve as diode 42 turns off is inherent characteristic of many semiconductor diodes.

Curve D represents the current through the damper diode 34. The damper diode will conduct briefly at the beginning of the trace cycle.

Curve E illustrates the current through the capacitor 24, and Curve F illustrates the voltage across the capacitor 24. It will be seen that current flows with respect to capacitor 24 in one direction prior to cut off of transistor 31 and, during the retrace cycle, reverses in direction. It should also be noted that diode 42 prevents the voltage across capacitor 24 from falling below the supply voltage illustrated by the dotted line under Curve F.

The operation of the system may be described in the following manner. Assume that transistor 31 has been on and current has built up in the windings 23 to the maximum level. A pulse from the horizontal oscillator 21 turns transistor 31 off. Current through windings 23 will not stop immediately, but will decay gradually as shown by Curve B to the zero level at the resonant frequency of the circuit comprising the windings 23 and the retrace capacitor 25. As the current decays through the yoke, the retrace capacitor 25 will be charged. Then, as the current in the yoke begins to swing negative, the retrace capacitor will begin discharging through the yoke and into the capacitor 24. The damper diode 34 will therefore be biased to cut off by capacitor 25 until capacitor 25 is discharged. At this point, the current through windings 23 has reached the opposite extent of its swing and will be at its maximum value in the opposite direction, as illustrated by the low peak in Curve B.

Once the current through the yoke has completed this cycle, the beam of electrons has been moved back to its initial starting point for another sweep across the screen of the cathode ray tube. Thus, as the damper diode 34 begins to conduct, the current through windings 23 begins to decay because the retrace capacitor 25 is discharged. At this point the windings 23 are now resonant in combination with capacitor 24. Capacitor 24 is substantially higher in value than capacitor 25 and, accordingly, the decay time for the current in windings 23 is greater than during retrace. This decaying current continues until the current in the yoke 23 is zero. At this point capacitor 24, which is now charged substantially above the supply voltage as may be seen in Curve F, begins discharging through the yoke simultaneously with the turning on of transistor 31 by the oscillator. The current through the windings 23 will build up as capacitor 24 discharges until the voltage across capacitor 24 falls to the level of the supply voltage. This may occur prior or subsequent to the turning off of the transistor, depending upon the losses in the circuit. The curves shown are for a low load system and the voltage across capacitor 24 does not fall to the level of the supply voltage until after retrace begins.

From the foregoing discussion it will be seen that the only time that energy is being supplied to the system is the period during which the voltage across capacitor 24 is equal to the supply voltage. At all other times, no energy need be supplied to the system. The voltage across capacitor 24 never falls below that of the supply voltage, eliminating the necessity for bringing the voltage across capacitor 24 up to the supply voltage after retrace. The system permits the use of a higher inductance yoke in series with the transistor because a higher voltage is available to produce current through the yoke. A higher impedance yoke results in lower losses because less current is required for a given deflection field strength. Also because of the lower current, lower losses are encountered due to the saturation resistance of the transistor. Furthermore, because the system operates at a higher voltage level, less expensive components may be used.

A practical operating circuit has been constructed using components of the following values and types:

| | |
|---|---|
| Windings **23** | 80 microhenries inductance. |
| Capacitor **24** | 13 microfarads capacitance. |
| Capacitor **25** | 0.1 to 0.4 microfarad. capacitance. |
| Diode **34** | 120 volts silicon. |
| Diode **42** | 100 volts germanium (fast, low forward resistance). |
| Transistor **31** | Switching type. |

It may be seen that the invention provides an improved horizontal deflection circuit for a cathode ray tube which utilizes a transistor with a relatively high impedance yoke. The system therefore requires lower current for greater efficiency. The deflection circuit of the invention also operates at a higher average voltage than has heretofore been possible with transistors.

I claim:

1. In a television receiver having a cathode ray tube, a horizontal deflection yoke having inductance, and a horizontal deflection system for energizing the yoke with a sawtooth current at a horizontal deflection frequency, to provide a horizontal sweep in the cathode ray tube, which current has trace and retrace portions, said deflection system including the combination of: a transistor having an input electrode and a pair of output electrodes, means to supply a drive signal to said input electrode for rendering said transistor conductive during at least part of the trace portion and non-conductive during at least the retrace portion to form the sawtooth current through the yoke, direct current operating voltage supply means, means connected in series with the yoke and said output electrodes for increasing the linearity of the horizontal sweep by correcting the shape of said sawtooth current while causing the voltage at the junction of said yoke and said last mentioned means to exceed the direct current operating voltage, said last mentioned means comprising a diode coupled to said voltage supply means to form a series circuit therewith, said last mentioned means further comprising capacitor means coupled in parallel electrical configuration with said diode and said supply means, said diode being poled with respect to said supply means to be conductive during the retrace portion of said sawtooth current.

2. The television receiver set forth in claim 1 wherein said capacitor means is tuned with the inductance of the yoke to a frequency related to the horizontal deflection frequency.

3. The television receiver set forth in claim 2 wherein said drive signal renders said transistor non-conductive during the retrace portion and during the initial part of the trace portion, said horizontal deflection system further including a damper diode coupled across said output electrodes and poled to conduct during the initial part of the trace portion to form the sawtooth current through the yoke.

References Cited

UNITED STATES PATENTS

| | | | |
|---|---|---|---|
| 2,956,202 | 10/1960 | Rhodes | 315—27 |
| 2,962,626 | 11/1960 | Berg | 315—27 |
| 3,174,074 | 3/1965 | Massman | 315—27 |
| 3,287,594 | 11/1966 | Wada | 315—27 |

JOHN W. CALDWELL, *Acting Primary Examiner.*

DAVID G. REDINBAUGH, *Examiner.*

W. S. FROMMER, *Assistant Examiner.*